United States Patent [19]
Katayama

[11] Patent Number: 5,699,150
[45] Date of Patent: Dec. 16, 1997

[54] VEHICLE OPTICAL RADAR APPARATUS

[75] Inventor: Koji Katayama, Tokyo, Japan

[73] Assignee: Mitsubushi Denki Kabushiki Kaisha, Tokyo, Japan

[21] Appl. No.: 581,205

[22] Filed: Dec. 29, 1995

[30] Foreign Application Priority Data

Jul. 14, 1995 [JP] Japan ................. 7-179195

[51] Int. Cl.$^6$ ................. G01C 3/08; G02B 26/08
[52] U.S. Cl. ................. 356/4.01; 356/5.01; 356/5.1; 356/141.1; 359/214; 359/215
[58] Field of Search ................. 356/4.01, 141.1, 356/5.01, 5.1; 359/213–215

[56] References Cited

U.S. PATENT DOCUMENTS

| | | | |
|---|---|---|---|
| 3,781,111 | 12/1973 | Fletcher et al. | 356/5.08 |
| 4,025,154 | 5/1977 | Yuta . | |
| 4,135,815 | 1/1979 | Masunaga et al. . | |

FOREIGN PATENT DOCUMENTS

| | | |
|---|---|---|
| 49-38645 | 4/1974 | Japan . |
| 3-175390 | 7/1991 | Japan . |
| 3-95979 | 9/1991 | Japan . |

*Primary Examiner*—Stephen C. Buczinski
*Attorney, Agent, or Firm*—Sughrue, Mion, Zinn, Macpeak & Seas, PLLC

[57] ABSTRACT

In this vehicle optical radar apparatus, the number of parts constituting an oscillating mechanism can be reduced, assembling facilities can be improved, an accumulated error of the parts can be decreased, and light weight and low cost can be obtained. An oscillating member (29) consists of a resin-molded product constituted by a light-sending mirror holding portion (33), a light-receiving mirror holding portion (34), and a cylindrical member. A shaft (30) fitted with the cylindrical member of the oscillating member (29) and a rotating shaft (22a) of a pulse motor are pivotally supported by a housing (24) and a cover which are the case of the pulse motor and consist of a resin-molded product. A follower (36) is rotatably attached to a follower attachment plate (35) attached to the light-receiving mirror holding portion (34). The follower (36) is stored in an eccentric cam groove (26a) of the cam (26) fixed to the rotating shaft (22a). Therefore, a light-sending mirror (14) and the light-receiving mirror (15) are synchronously oscillated about the shaft (30) as serving as an oscillation center.

5 Claims, 3 Drawing Sheets

VEHICLE OPTICAL RADAR APPARATUS

BACKGROUND OF THE INVENTION

1. Field of the Invention

The present invention relates to a radar apparatus loaded on a vehicle such as an automobile to detect a distance between the vehicle and an obstruction and, more particularly, to a vehicle optical radar apparatus which mainly scans and irradiates beam light from a light-emitting source, and receive the reflected light from an object to detect a distance to the object.

2. Description of the Related Art

In a conventional vehicle optical radar apparatus, in order to scan and irradiate beam light from a light-emitting source, the following method is employed. That is, a cam is attached to the output shaft of a motor ASSY, a follower is oscillated by the cam about an oscillation fulcrum shaft, and a light-sending mirror and a light-receiving mirror are oscillated by the movement of the follower.

In the conventional vehicle optical radar apparatus, parts constituting an oscillating mechanism are sequentially attached with screws to a plate manufactured by sheet-metal pressing. In addition, a position sensor for detecting a reference position of an oscillating member and a detection sensor for detecting scattered light of a main beam from a glass surface to detect some stain on the glass surface are attached with screws to the plate to which the parts constituting the oscillating mechanism are attached.

The cam follower or the fulcrum portion serving as an oscillating member is made of a sheet-metal member obtained by pressing a plate member, and a metal member consisting of a metal material is fixed to the fulcrum portion by press fitting or calking.

In the conventional vehicle optical radar apparatus, as described above, the parts constituting the oscillating mechanism are sequentially attached to the plate manufactured by sheet-metal pressing. For this reason, the number of parts constituting the oscillating mechanism increases, a long time is required to assemble the parts, and the oscillating mechanism increases in weight.

In order to scan and irradiate beam light in a predetermined direction which is determined at a high accuracy, attachment holes for attaching the parts constituting the oscillating mechanism must be formed in the plate formed by sheet-plate pressing in such a manner that the positions and angles of the attachment holes are set at a high accuracy. Therefore, a processing shape is complicated, and the number of processing steps increases. The positional accuracy and angular accuracy of a desired attachment hole cannot be easily obtained, and the cost of manufacturing a metal mold is high, thereby increasing the total cost.

SUMMARY OF THE INVENTION

The present invention has been made to solve the above problems, and has as its object to obtain a vehicle optical radar apparatus in which the number of parts constituting an oscillating mechanism is reduced, assembling facilities can be improved, an accumulated error of the parts can be decreased, light weight and low cost can be obtained.

In order to achieve the above object, according to an aspect of the present invention, there is provided a vehicle optical radar apparatus comprising a light-emitting element for emitting an irradiation laser beam, a light-sending mirror for reflecting the irradiation laser beam forward, a light-receiving mirror for reflecting a reflected laser beam from a forward object, a light-receiving lens for focusing the reflected laser beam reflected by the light-receiving mirror, a light-receiving element for receiving the reflected laser beam focused by the light-receiving lens, an oscillating member capable of being oscillated about an oscillation center shaft serving as a rotation center and mounting the light-sending mirror and the light-receiving mirror thereon, an oscillating member drive source, and torque transmission means for converting a rotational torque of an output shaft of the oscillating member drive source into an oscillation torque and for transmitting the oscillation torque to the oscillating member, the oscillating member drive source having a case made of a resin-molded product, and the output shaft and the oscillation center shaft being pivotally supported by the case.

DESCRIPTION OF THE PREFERRED EMBODIMENT

Figure 1:
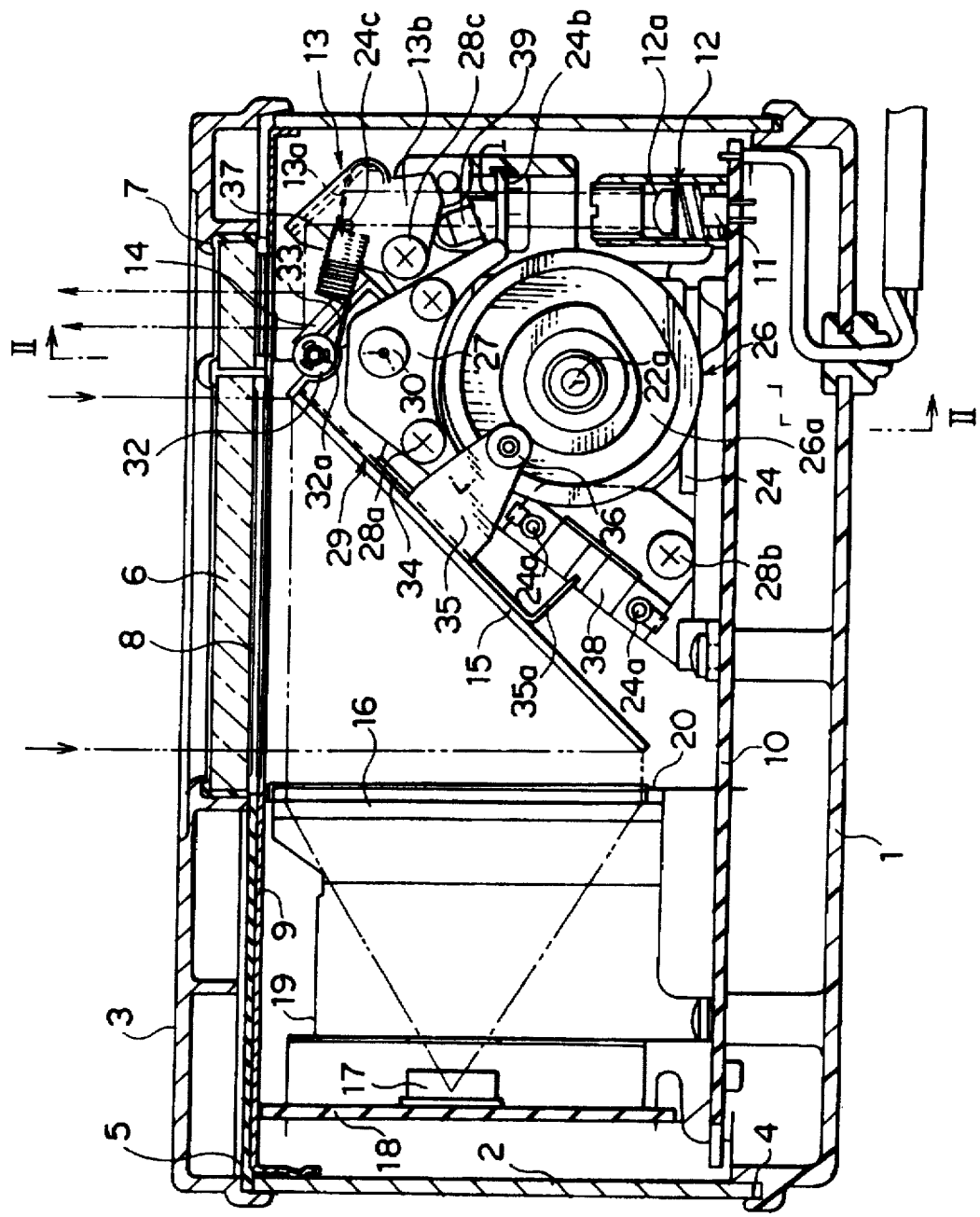
FIG. 1 is a sectional view showing a vehicle optical radar apparatus according to an embodiment of the present invention.
Figure 2:
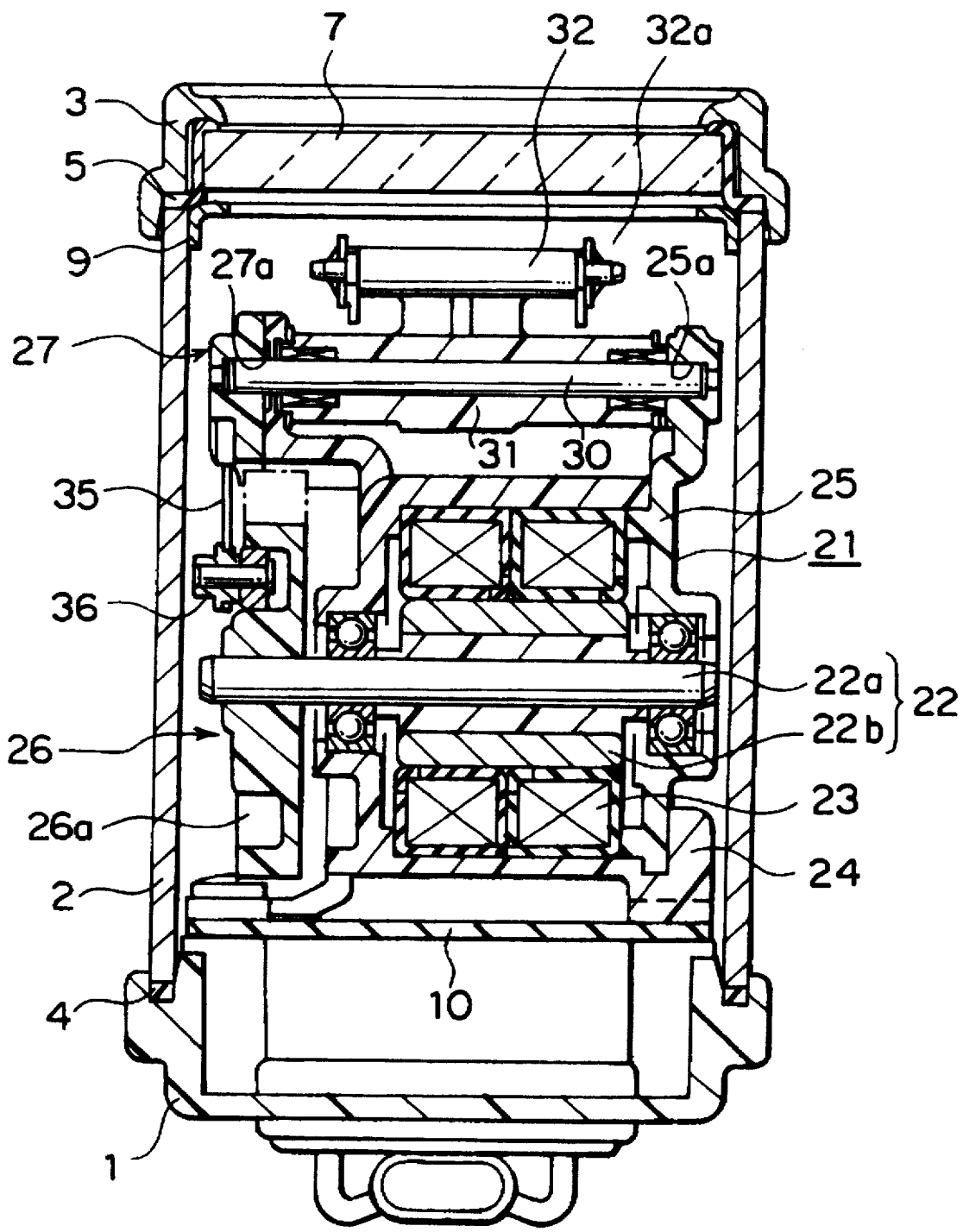
FIG. 2 is a sectional view showing the vehicle optical radar apparatus along an arrow II—II in FIG. 1.

FIG. 1 is a sectional view showing a vehicle optical radar apparatus according to an embodiment of the present invention, and FIG. 2 is a sectional view showing the vehicle optical radar apparatus along an arrow II—II in FIG. 1.

Referring to FIGS. 1 and 2, a housing of the vehicle optical radar apparatus is constituted to have an airtight structure in which an aluminum case 2 is attached to a resin rear cover 1 through a packing 5, and an aluminum front cover 3 is attached to the case 2 through the packing 5.

A glass 6 on which a reflected laser beam from an object is incident is fitted in a window portion of the front cover 3. A glass 7 which emits an irradiation laser beam is fitted in another window portion of the front cover 3. A filter 8 for interrupting passage of visible light is arranged on the inner surface of the glass 6 in such a manner that only the reflected laser beam from the object is incident through the glass 6. These glasses 6 and 7 and the filter 8 are pressed against the front cover 3 by a plate 9 arranged inside the case 2 so as to be fixed to the front cover 3.

A main substrate 10 is mounted with a control electronic element, and is attached to the rear cover 1. A light-emitting element 11 for emitting an irradiation laser beam is mounted on the main substrate 10, and a lens ASSY 12 having a lens 12a which adjusts the irradiation laser beam emitted from the light-emitting element 11 such that the irradiation laser beam has a predetermined beam divergence angle is mounted on the main substrate 10. A fixed mirror ASSY 13 serving as a reelecting mirror is constituted such that a mirror 13a is attached to the inner surface of an attachment plate 13b which is bent to have an L shape. The fixed mirror ASSY 13 is arranged on the optical path of the irradiation laser beam from the light-emitting element 11, and the irradiation laser beam is reflected by the mirror 13a to change the direction of the irradiation laser beam. A light-sending mirror 14 is arranged inside the glass 7. The light-sending mirror 14 reflects the irradiation laser beam having a direction changed by the mirror 13a, and emits the reflected laser beam forward through the glass 7.

A light-receiving mirror 15 is arranged inside the glass 6. The light-receiving mirror 15 reflects a reflected laser beam which is reflected from the front object and incident through the glass 6, so as to change the direction of the reflected laser beam. A light-receiving lens 16 focuses the reflected laser beam reflected by the light-receiving mirror 15 on a light-receiving element 17 on the next stage. The light-receiving element 17 is mounted on a light-receiving substrate 18, and is arranged at the focal position of the light-receiving lens 16. A case 19 is attached to the light-receiving substrate 18 to cover the light-receiving element 17, thereby shielding electromagnetic wave noise. The light-receiving lens 16 is fixed on one end face side of the case 19 by a plate 20, and the distance between the light-receiving lens 16 and the light-receiving element 17 is assured to be a predetermined distance.

A pulse motor 21 serving as an oscillating member drive source is constituted by: a rotor 22 having a rotating shaft 22a serving as an output shaft and a permanent magnet 22b; a coil 23 moved together with the permanent magnet 22b to generate a torque; and a housing 24 and a cover 25 for storing and holding the rotor 22 and the coil 23. The pulse motor 21 is attached to the main substrate 10. A cam 26 is fixed to the rotating shaft 22a of the pulse motor 21. This housing 24 consists of a resin-molded product. The housing 24 pivotally supports one end of the rotating shaft 22a, and coaxially stores and holds the coil 23 on the outer periphery of the rotor 22. The cover 25 consists of a resin-molded product like the housing 24. The cover 25 is fitted in the opening end of the housing 24, and pivotally supports the other end of the rotating shaft 22a.

A holder 27 consists of a resin-molded product. The holder 27 is positioned to the housing 24, and then fixed to the housing 24 with a screw 28a. The holder 27 has a bearing portion 27a which pivotally supports one end of a shaft 30 serving as an oscillation center shaft serving as the oscillation center of an oscillating member 29. A bearing portion 25a is integrally formed in the cover 25. This bearing portion 25a pivotally supports the other end of the shaft 30.

Note that the housing 24, the cover 25, and the holder 27 constitute a member consisting of a resin-molded product.

The oscillating member 29 is constituted by: a cylindrical member 31 serving as a rotating member and fitted with the shaft 30; an arm 32 which is located above the cylindrical member 31 to oppose thereto and has spring bearing portions 32a arranged at both the ends of the arm 32; a light-sending mirror holding portion 33 which is located on one side of the cylindrical member 31 and the arm 32 and to which the light-sending mirror 14 is attached; and a light-receiving mirror holding portion 34 which is located on the other side of the cylindrical member 31 and arm 32 and to which the light-receiving mirror 15 is attached. These parts are integrated with each other to form a resin-molded product. A follower attachment plate 35 is positioned to the light-receiving mirror holding portion 34 of the oscillating member 29, and then fixed to the light-receiving mirror holding portion 34 by calking. A follower 36 inserted into an eccentric cam groove 26a of the cam 26 is rotatably attached to the follower attachment plate 35. A spring 37 arranged between the spring bearing portion 32a of the arm 32 and the housing 24 biases the oscillating member 29 in a direction to bring the follower 36 into contact with the eccentric cam groove 26a. Note that the follower attachment plate 35, the follower 36, and the cam 26 constitute a torque transmission means.

A position sensor 38 is constituted by light-emitting and light-receiving elements which form a pair. The position sensor 38 is fitted on projections 24a integrally formed on the housing 24 as attachment portions so as to be positioned. The position sensor 38 is fixed to the housing 24 with a screw 28b. A stain detection sensor 39 has a light-receiving element. The stain detection sensor 39 fitted in a guide groove 24b integrally formed in the housing 24 as an attachment portion in such a manner that the stain detection sensor 39 faces toward the glass 7. The fixed mirror ASSY 13 is fitted on a projection 24c integrally formed on the housing 24 as an attachment portion so as to be positioned, and the fixed mirror ASSY 13 is fixed to the housing 24 with a screw 28c.

In order to assemble the oscillating mechanism of the vehicle optical radar apparatus arranged as described above, the coil 23 and the rotor 22 are stored in the housing 24, and the cover 25 is fitted on the opening end of the housing 24. In this case, the rotating shaft 22a of the rotor 22 is pivotally supported by the housing 24 and the cover 25. The cam 26 is fixed to the rotating shaft 22a of the rotor 22. One end of the shaft 30 is inserted into the bearing portion 25a of the cover 25. The shaft 30 is fitted with the cylindrical member the oscillating member 29 in such a manner that the follower 36 is located in the eccentric cam groove 26a of the cam 26. Thereafter, the other end of the shaft 30 is inserted into the bearing portion 27a of the holder 27. Note that the follower attachment plate 35 and the follower 36 are attached, in advance, to the oscillating member 29 attached to the shaft 30. The holder 27 is positioned to the housing 24, and then fixed to the housing 24 with the screw 28a to be integrally attached to the housing 24. In this case, the shaft 30 is pivotally supported by the cover 25 and the holder 27. The light-sending mirror 14 and the light-receiving mirror 15 are attached to the light-sending mirror holding portion 33 and the light-receiving mirror holding portion 34, respectively. Thereafter, one end of the spring 37 is hung on the spring bearing portion 32a of the arm 32, and the other end is hung on the housing 24, so that the spring 37 is arranged. In this manner, the oscillating mechanism is assembled.

Note that the fixed mirror ASSY 13 is fitted on the projection 24c of the housing 24 so as to be positioned, and then integrally attached to the housing 24 with the screw 28c. A bent portion 35a of the follower attachment plate 35 is located between the light-emitting and light-receiving elements of the position sensor 38.

An operation of the vehicle optical radar apparatus arranged as described above will be described below with reference to FIG. 3.

The light-emitting element 11 emits an irradiation laser beam on the basis of a light-sending signal output from the main substrate 10. The flux of the irradiation laser beam is focused on a predetermined range by the lens 12a, reflected by the mirror 13a and the light-sending mirror 14, and irradiated from the glass 7 to the front of the vehicle through an optical path indicated by a broken line in FIG. 3. When the light-sending laser beam is irradiated on the object in front of the vehicle, the reflected laser beam returns to the vehicle side through the broken line in FIG. 3. The reflected laser beam which is incident on the glass 6 is reflected by the light-receiving mirror 15, focused by the light-receiving lens 16, and received by the light-receiving element 17. The light-receiving substrate 18 receives a light-receiving signal from the light-receiving element 17, and arithmetically processes the distance between the vehicle and the object on the basis of the light-receiving signal and the light-sending signal.

The pulse motor 21 is rotatably driven on the basis of an exciting signal of the coil 23 output from the main substrate 10. The cam 26 fixed to the rotating shaft 22a is rotated. The follower 36 is oscillated along the cam curve of the eccentric cam groove 26a. With this oscillating operation of the follower 36, the oscillating member 29 is oscillated about the shaft 30 serving as an oscillation center. With this oscillating movement of the oscillating member 29, the light-sending mirror 14 and the light-receiving mirror 15 are oscillated about the shaft 30 serving as the oscillation center.

At this time, with the oscillating movement of the oscillating member 29, the bent portion 35a of the follower attachment plate 35 comes in and out between the light-emitting element and light-receiving element of the position sensor 38 to shield or transmit exit light from the light-emitting element. For example, when the position sensor 38 is designed such that a detection signal from the position sensor 38 changes from an OFF state (exit light shielding state) to an ON state (exit light transmitting state) at an oscillation reference position of the oscillating member 29, the oscillation reference position of the oscillating member 29 is detected on the basis of the detection signal of the position sensor 38. The exit direction of the irradiation laser beam reflected by the light-sending mirror 14 is determined on the basis of the relationship between the detection signal of the position sensor 39 and the exciting signal of the coil 23. The irradiation laser beam is scanned and irradiated in such a manner that the irradiation laser beam reciprocates in a direction between an alternate long and short dash line and an alternate long and two short dashes line in FIG. 3 once a rotation of the cam 26.

Figure 3:
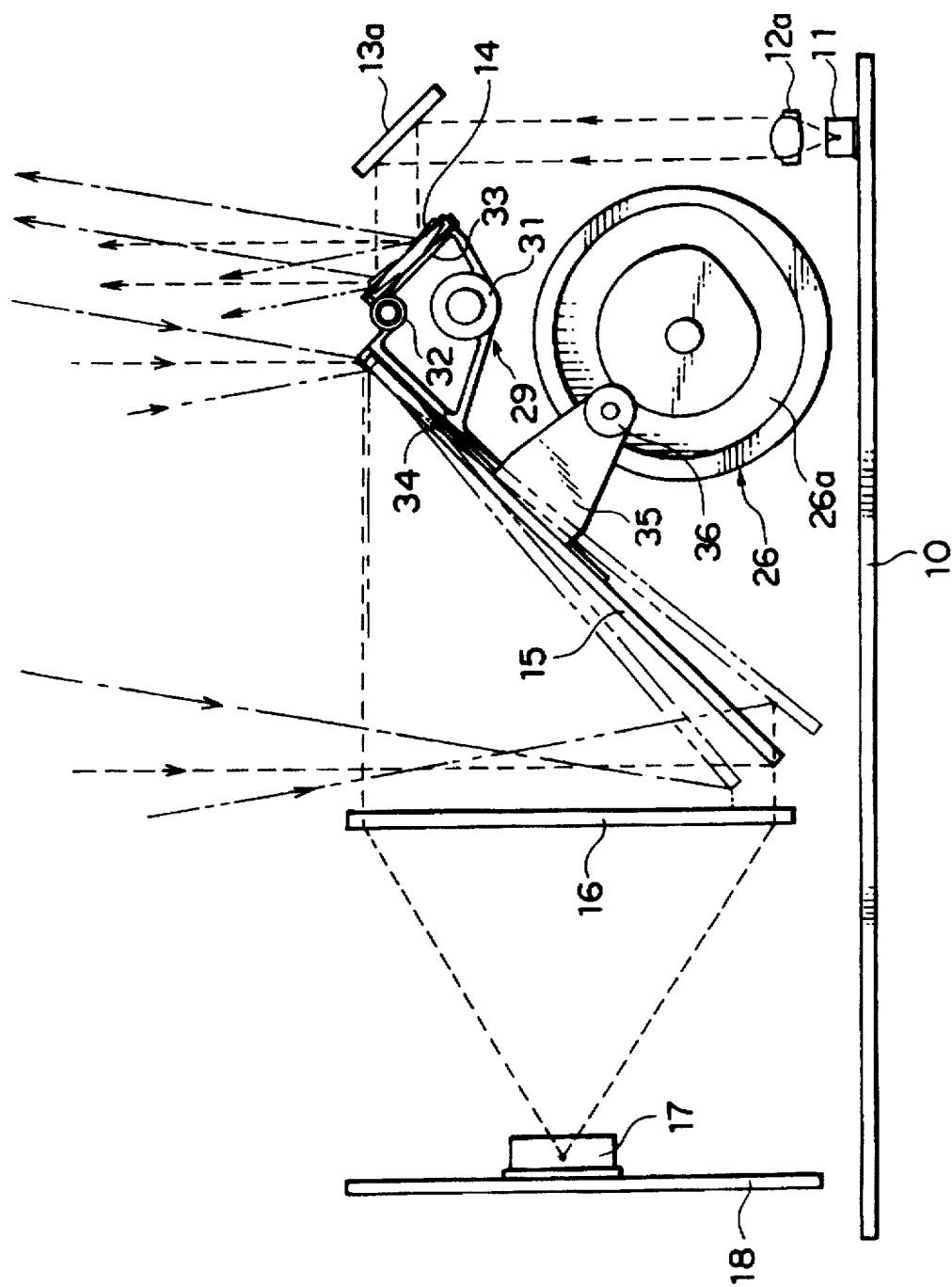
FIG. 3 is a view for explaining an operation of the vehicle optical radar apparatus according to the embodiment of the present invention.

The irradiation laser beam is emitted to be incident on an object, and the laser beam reflected by the object returns to the vehicle in the direction between the alternate long and short dash line and the alternate long and two short dashes line in FIG. 3. At this time, since the light-receiving mirror 15 is oscillated in synchronism with the light-sending mirror 14, the reflected laser beam is reflected by the light-receiving mirror 15, and is incident on the light-receiving lens 16 at an almost right angle with respect to the plane of the light-receiving lens 76. Therefore, the reflected laser beam from the object is always efficiently focused on an almost focal position of the light-receiving lens 16, and the light-receiving signal of the light-receiving element 17 is stably obtained.

In this manner, according to the vehicle optical radar apparatus, the distance between the vehicle and the forward object and the direction of the object can be detected.

The irradiation laser beam reflected by the light-sending mirror 74 is emitted forward through the glass 7. At this time, when the surface of the glass 7 is stained, the irradiation laser beam is partially reflected by the glass 7, and received by the light-receiving element of the stain detection sensor 39. Therefore, the stain state of the glass 7 can be detected on the basis of a detection signal from the stain detection sensor 39, and the glass 7 can be efficiently cleaned.

Visible light which is incident through the glass 6 is shielded by the filter 8, and only the reflected laser beam reaches the light-receiving element 17. The detection accuracy of the light-receiving element 17 becomes high.

As described above, according to the present invention, the case of the pulse motor 21 is constituted by the housing 24 and the cover 25 which consist of a resin-molded product, and the rotating shaft 22a is pivotally supported by the housing 24 and the cover 25. The shaft 30 is pivotally supported by the holder 27 and the cover 25 which consist of a resin-molded product positioned to and fixed on the housing 24.

The cover 25 and the holder 27 are positioned to the housing 24, and the positional relationship between the rotating shaft 22a and the shaft 30 can be assured at a high accuracy, thereby increasing the detection accuracy of the object.

The case of the pulse motor 21 is constituted by the housing 24 and the cover 25 which consist of a resin-molded product, and the oscillating member 29 is integrally constituted by a resin-molded product. For this reason, the number of constituent parts can be reduced, assembling facilities can be improved, and low cost and light weight can be obtained. In addition, since the housing 24 consists of a resin-molded product, a project or a guide groove serving as a positioning/attachment portion can be formed in molding of the housing 24, no step of processing the positioning/attachment portion is required, low cost can be obtained accordingly. Furthermore, since the constituent parts are attached by using the housing 24 as an assembling reference, an accumulated error of the parts can be decreased.

Since the oscillating member 29 is constituted in such a manner that the light-sending mirror holding portion 33, the light-receiving mirror holding portion 34, and the cylindrical member 31 are integrally formed by a resin-molded product, the angular/positional relationship between the light-sending mirror 14 and the light-receiving mirror 15 can be assured at a high accuracy. Therefore, the light-sending mirror 14 and the light-receiving mirror 15 are oscillated with keeping the angular/positional relationship therebetween, and the reflected laser beam from the object can be efficiently received by the light-receiving element 17.

The cam 26 is fixed to the rotating shaft 22a, the follower attachment plate 35 is attached to the light-receiving mirror holding portion 34, and the follower 36 rotatably attached to the follower attachment plate 35 is stored in the eccentric cam groove 26a of the follower 36. For this reason, when the cam 26 is rotated, the follower 36 is oscillated along the cam curve of the eccentric cam groove 26a, and the light-receiving mirror holding portion 34 is oscillated about the shaft 30 serving as an oscillation center. In this case, when the size of the follower attachment plate 35 and the cam curve of the eccentric cam 26 are set, a desired oscillating operation of the oscillating member 29 can be easily achieved.

The projections 24a are formed on the housing 24, and the position sensor 38 is fitted on the projections 24a to be fixed to the housing 24 with the screw 28b. For this reason, the position sensor 38 can be positioned to the housing 24 like the shaft 30. Therefore, the positional relationship between the position sensor 38 and the oscillating member 29 attached to the shaft 30 can be assured at a high accuracy, and the detection accuracy of the oscillation reference position of the oscillating member 29 can be improved. Furthermore, the irradiation laser beam can be scanned in an accurately determined direction to be irradiated.

The projection 24c is formed on the housing 24, and the fixed mirror ASSY 13 is fitted on the projection 24c to be fixed to the housing 24 with the screw 28c. For this reason, the fixed mirror ASSY 13 is positioned to the housing 24 like the shaft 30. Therefore, the positional relationship between the mirror 13a and the oscillating member 29 attached to the shaft 30 can be assured at a high accuracy. In this case, the positional relationship between the mirror 13a and the light-sending mirror 14 attached to the oscillating member 29 can be assured at a high accuracy, and the irradiation laser beam emitted from the light-emitting element 11 is reliably irradiated on the light-sending mirror 14 through the mirror 13a.

The guide groove 24b is formed in the housing 24, and the stain detection sensor 39 is fitted in the guide groove 24b to be fixed to the housing 24. For this reason, the positional relationship between the stain detection sensor 39 and the glass 7 can be assured at a high accuracy, and the detection accuracy of a stain of the glass 7 can be improved.

Note that, in the above embodiment, although the holder 27 is integrally fixed to the housing 24 with the screw 28a, the housing 24 and the holder 27 may be integrally resin-molded. In addition, although the cylindrical member 31 of the oscillating member 29 is fitted with the shaft 30, the cylindrical member 31 and the shaft 30 may be integrally resin-molded. In this case, the number of constituent parts can be reduced, and assembling facilities can be improved.

What is claimed is:

1. A vehicle optical radar apparatus comprising:
    a light-emitting element for emitting an irradiation laser beam;
    a light-sending mirror for reflecting said irradiation laser beam forward;
    a light-receiving mirror for reflecting a reflected laser beam from a forward object;
    a light-receiving lens for focusing said reflected laser beam reflected by said light-receiving mirror;
    a light-receiving element for receiving said reflected laser beam focused by said light-receiving lens;
    an oscillating member capable of being oscillated about an oscillation center shaft serving as a rotation center and mounting said light-sending mirror and said light-receiving mirror thereon;
    an oscillating member drive source; and
    torque transmission means for converting a rotational torque of an output shaft of said oscillating member drive source into an oscillation torque and for transmitting said oscillation torque to said oscillating member;
    said oscillating member drive source having a case made of a resin-molded product, and said output shaft and said oscillation center shaft being pivotally supported by said case.

2. A vehicle optical radar apparatus according to claim 1, wherein said oscillating member is made of a resin-molded product obtained by integrally forming a light-sending mirror holding portion for holding said light-sending mirror, a light-receiving mirror holding portion for holding said light-receiving mirror, and a rotating portion rotatably fitted on said oscillation center shaft.

3. A vehicle optical radar apparatus according to claim 2, wherein said torque transmission means comprises a cam fixed to said output shaft of said oscillating member drive source and having an eccentric cam groove formed in an end face of said cam, a follower attachment plate attached to said light-receiving mirror holding portion, and a follower rotatably attached to said follower attachment plate and stored in said eccentric cam groove, in a rotating operation of said cam, said follower is oscillated along a cam curve of said eccentric cam groove, and an oscillating operation of said follower is transmitted to said light-receiving mirror holding portion through said follower attachment plate.

4. A vehicle optical radar apparatus according to claim 1 further comprising a position sensor for detecting an oscillation reference position of said oscillating member, said case having a position sensor attachment portion and said position sensor being attached to said position sensor attachment portion.

5. A vehicle optical radar apparatus according to claim 1 further comprising a reflecting mirror for reflecting said irradiation laser beam from said light-emitting element to irradiate a reflected laser beam on said light-sending mirror, said case having a reflecting mirror attachment portion and said reflecting mirror being attached to said reflecting mirror attachment portion.

* * * * *